(12) United States Patent
Hayashi et al.

(10) Patent No.: US 7,768,287 B2
(45) Date of Patent: Aug. 3, 2010

(54) METHODS AND APPARATUS FOR MANAGING DEFECTIVE PROCESSORS THROUGH POWER GATING

(75) Inventors: Atsushi Hayashi, Kanagawa (JP); Akiyuki Hatakeyama, Tokyo (JP); Taichi Niki, Kanagawa (JP); Yoichi Nishino, Tokyo (JP)

(73) Assignee: Sony Computer Enterainment Inc., Tokyo (JP)

( * ) Notice: Subject to any disclaimer, the term of this patent is extended or adjusted under 35 U.S.C. 154(b) by 721 days.

(21) Appl. No.: 11/620,873

(22) Filed: Jan. 8, 2007

(65) Prior Publication Data

US 2007/0176625 A1    Aug. 2, 2007

Related U.S. Application Data

(60) Provisional application No. 60/763,013, filed on Jan. 27, 2006.

(51) Int. Cl.
*G01R 31/02* (2006.01)
*G06F 1/26* (2006.01)

(52) U.S. Cl. .................. 324/763; 324/142; 324/158.1; 713/500; 716/4; 327/143

(58) Field of Classification Search ......... 713/300–340, 713/500–601; 324/763, 142, 158.1; 716/4
See application file for complete search history.

(56) References Cited

U.S. PATENT DOCUMENTS

| 6,333,650 B1 * | 12/2001 | Amin et al. .................. 327/143 |
| 6,526,491 B2 | 2/2003 | Suzuoki et al. |
| 7,337,333 B2 * | 2/2008 | O'Conner et al. ........... 713/300 |
| 2004/0221182 A1 * | 11/2004 | He et al. ...................... 713/300 |
| 2005/0036259 A1 * | 2/2005 | Hokenmaier ................ 361/104 |

* cited by examiner

*Primary Examiner*—Ha Tran T Nguyen
*Assistant Examiner*—Emily Y Chan
(74) *Attorney, Agent, or Firm*—Matthew B. Dernier, Esq.; Gibson & Dernier LLP (57) ABSTRACT

Methods and apparatus provide for: selectively supplying a first source of power to a plurality of circuit blocks of a system using a plurality of gate circuits responsive to respective control signals provided by at least one control circuit; and providing a second source of power to operate the control circuit before the first source of power is available to the gate circuits such that the control signals are valid before such availability.

20 Claims, 9 Drawing Sheets

FIG. 1

(Prior Art)

METHODS AND APPARATUS FOR MANAGING DEFECTIVE PROCESSORS THROUGH POWER GATING

CROSS REFERENCE TO RELATED APPLICATIONS

This application claims the benefit of U.S. Provisional Patent Application No. 60/763,013, filed Jan. 27, 2006, the entire disclosure of which is hereby incorporated by reference.

BACKGROUND

The present invention relates to methods and apparatus for managing defective processors of a multiprocessing system within an integrated circuit.

Large scale integrated circuits are being designed to accommodate an ever increasing number of circuits in order to achieve higher and higher functionality. For example, digital circuits (or analog circuits) are being designed with very high numbers of gates and other functional circuitry to meet processing objectives in the marketplace. As the complexity of integrated circuits (ICs) continue to increase, however, the number of transistors and other components used to implement the circuitry also increases and the probability of a faulty component or circuit occurring in an IC approaches one. The existence of a faulty circuit or component may require that the IC be discarded.

Figure 1:
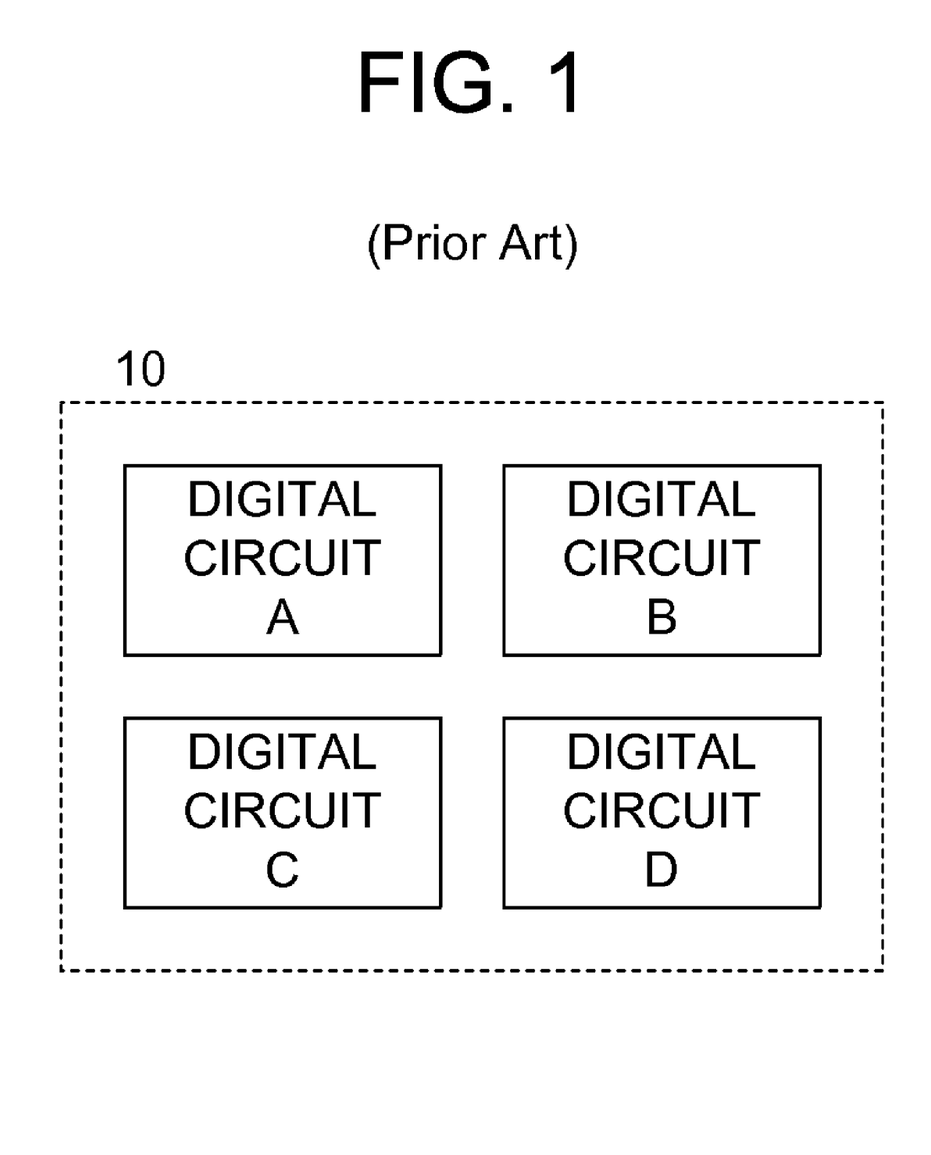
FIG. 1 is a block diagram illustrating the structure of a system employing redundant circuitry in accordance with the prior art.

It has been proposed to use redundant circuits on the IC in order to permit replacement of the circuitry containing a faulty component. For example, FIG. 1 illustrates an IC 10 employing digital circuit A, digital circuit B, digital circuit C, and digital circuit D, where one or more of the circuits may be redundant. Thus, even when a fault occurs, the IC 10 may be salvaged by enabling the redundant circuit. This can increase the IC yield and save the IC manufacturer a considerable amount of money. While the redundant circuit(s) may be activated and used in place of the faulty components, the faulty component may be deactivated. Conventional techniques for activating good circuits and deactivating faulty circuits include blowing fuses, such as electrical fuses (e-fuses) and/or laser-trimmed fuses.

The components or circuits of an IC may be faulty due to improper fabrication. For example, an imperfection may have been present on the substrate during fabrication or the fabrication procedure itself may be faulty. Improperly fabricated ICs may be discovered during IC testing, prior to packaging. If a faulty component is discovered on an IC during pre-packaging IC testing, the faulty component may be deactivated and a redundant circuit activated to take its place through the blowing of certain fuses, preferably, laser fuses since access to the IC is possible because the IC has yet to be packaged.

ICs may also be damaged after the pre-packaging IC testing. The components or circuits of an IC may be faulty due to damage during the packaging of the IC, for example, when the die is cut from the wafer, when the wafer is cleaned, when the die is bonded to the packaging, and so forth. ICs that become faulty due to packaging are usually not discovered until post-packaging testing. Since the packaging of an IC can be a considerable amount of the overall cost of manufacturing the IC, simply discarding a faulty IC could be expensive. A conventional technique proposes the use of additional redundant circuits that can be activated in place of the faulty components discovered in post-packaging IC testing. These additional redundant circuits can be activated through the use of electrical fuses (e-fuses), rather than laser fuses, since direct access to the IC is not possible. This can permit the use of a packaged IC that would have otherwise been discarded.

In order to minimize the complexity of the power and clock distribution networks of the IC, the redundant circuitry usually shares common power and clock distribution networks with the other circuits of the IC. Thus, in the majority of IC, the redundant circuitry is being actively clocked and powered although it is not being used. This can increase power consumption of the IC. Similarly, when a circuit containing a fault is disabled, it is still actively clocked and powered, which also contributes to the power consumption problem.

U.S. Patent Publication 2005-0036259, which is incorporated herein by reference, addresses the power consumption problem by proposing to gate the signaling and power to the redundant circuitry, such that the unused redundant circuitry does not receive clock signals or power. The decision as to whether to enable or disable the signaling and power to the unused redundant circuitry is based on the state of fuses used to enable/disable the redundant circuitry.

Unfortunately, the gating of clock signals and power (as well as other signaling) to unused redundant circuitry of an IC is not always practical or desirable.

Further, improper power and/or clock gating to faulty circuitry may arise during power up conditions because control signaling to the power gating devices may be unstable. Such improper gating may result in undesirable circuit operation on a temporary or permanent basis. For example, if during power up the control circuit commands one or more gating devices to permit power and/or clock signals to an associated faulty circuit, such circuit may affect neighboring circuits. This might occur, for example, if the faulty circuit exhibits electromagnetic interference that prevents proper operation of an adjacent circuit. Even if the faulty circuit receives power and/or clocking for a limited duration (e.g., prior to stabilization of the control signaling to the gating devices), the interference may require a re-initialization of the adjacent circuit in order to clear the effects of the interference.

Thus, another technique to permit enabling and disabling of circuitry on an IC is needed that limits unnecessary power dissipation by disabled circuitry and also insures that improper activation of the disabled circuitry is avoided.

SUMMARY OF THE INVENTION

It is noted that some ICs are designed with a plurality of circuits that are intended more for parallel functionality as opposed to redundancy. For example, in a parallel processing system, a number of processing circuits may be disposed in an IC, where each of the processors may operate in series or parallel to achieve a processing objective. While the processors may be redundant in the sense that they can perform the same functions, they are primarily provided for operation in parallel (and/or series) to increase processing performance.

By way of example, a multiprocessing system may have a potential of eight valid sub-processing units (SPUs processors) in a common IC. As discussed above, some of the SPUs may be faulty and, therefore, the overall performance of the IC may be reduced. Instead of enabling a redundant SPU to replace the faulty SPU, one or more embodiments of the invention contemplate disabling the faulty SPU and using the reduced performance multiprocessing system in an application (e.g., a product) that does not require a full complement of SPUs. For example, a high performance video game product may require a full complement of SPUs; however, a digital television (DTV) might not require a full complement of SPUs. Depending on the complexity of the application in which the multiprocessing system is to be used, a lesser number of SPU processors may be employed by disabling the faulty SPU processors and using the resulting multiprocessing system in a less demanding environment (such as a DTV).

Although it is desirable that disabling the unwanted SPU processors reduces the power dissipation within the CELL processor, conventional techniques have not adequately disconnected unwanted SPU processors from the power supply. Thus, one or more embodiments of the invention contemplate providing a means for disabling the unwanted SPU that also considerably reduces the power dissipation thereof by substantially interrupting power supply current from flowing through the SPU.

In accordance with one or more further embodiments of the invention, an SPU may be disabled even though it is not faulty. Indeed, in order to reduce power consumption in a particular application, one or more SPUs may be disabled when the application does not require a full complement of SPUs to achieve its performance goals.

In accordance with one or more embodiments of the present invention, methods and apparatus provide for: selectively supplying a first source of power to a plurality of circuit blocks of a system using a plurality of gate circuits responsive to respective control signals provided by at least one control circuit; and providing a second source of power to operate the control circuit before the first source of power is available to the gate circuits such that the control signals are valid before such availability.

Preferably, the control signaling, when valid, indicate not supplying the first source of power to any of the circuit blocks that are predetermined to be disabled.

In one or more embodiments, the second source of power is produced by gating the first source of power in accordance with a delay. The delay is predetermined and/or fixed. Alternatively, the first and second sources of power are separate power supplies, where the second power supply is initiated before the first power supply.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PRESENT INVENTION

Figure 2:
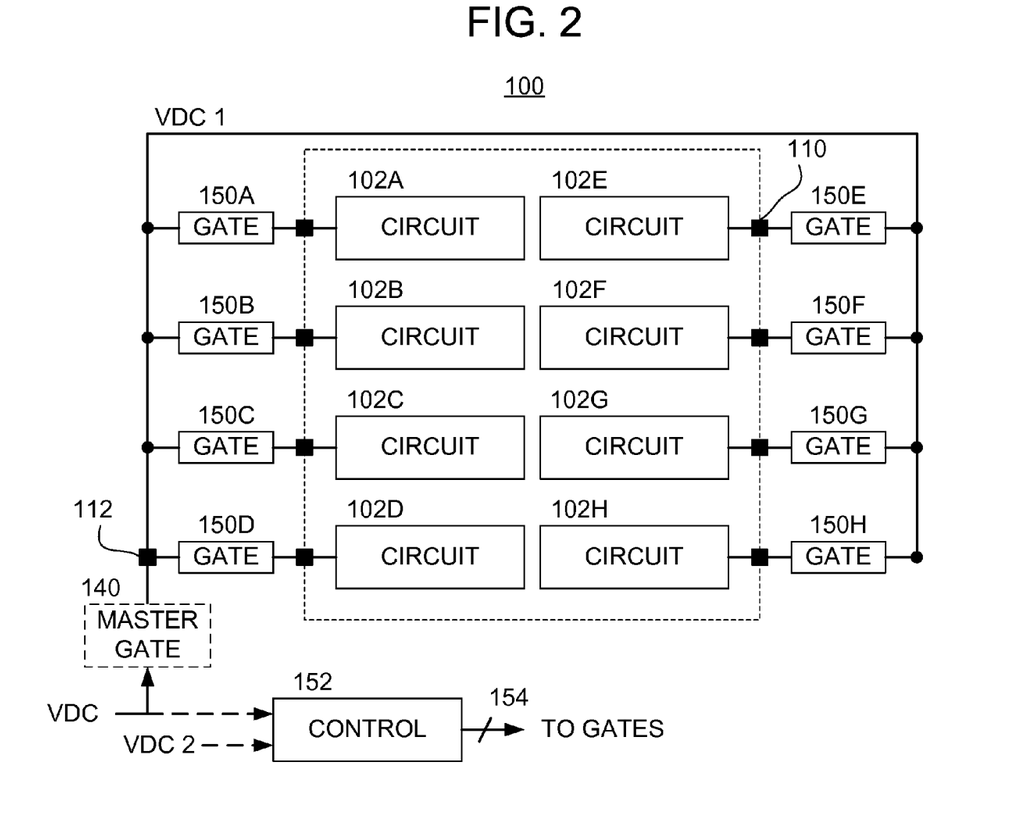
FIG. 2 is a block diagram illustrating a multi-circuit system in accordance with one or more embodiments of the present invention.
Figure 3:
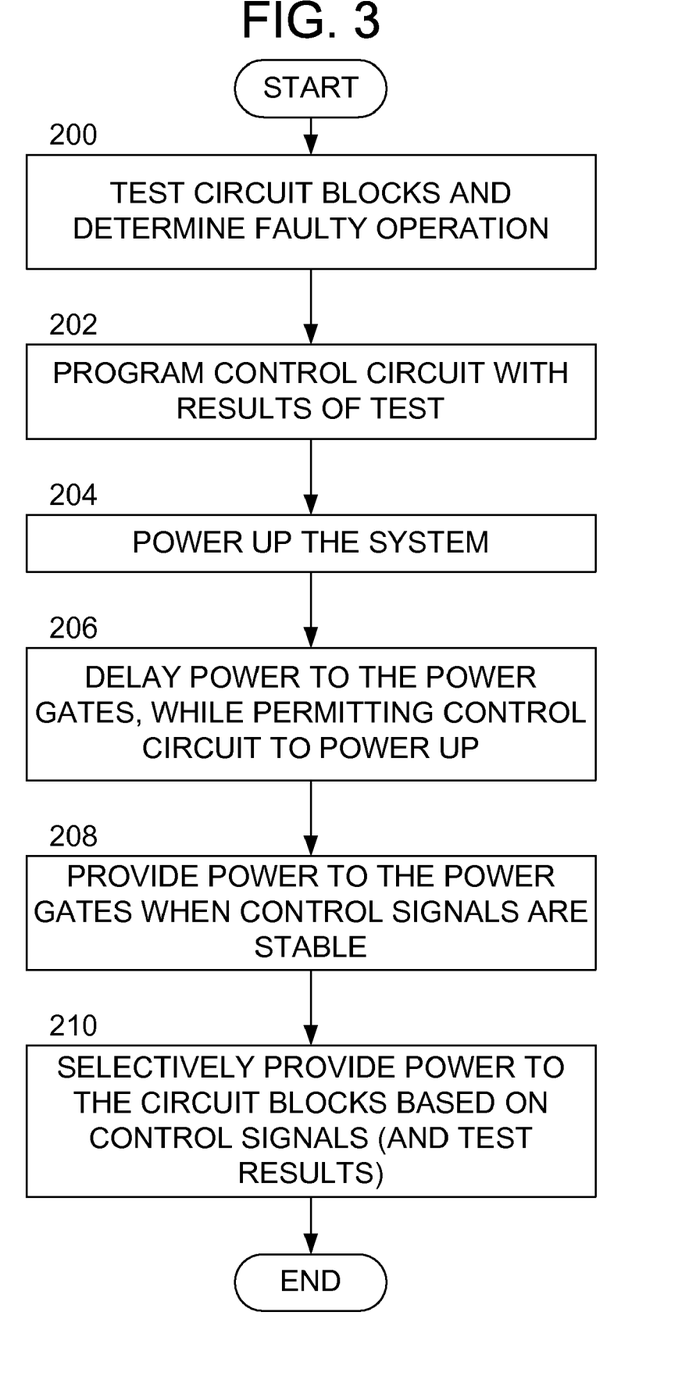
FIG. 3 is a flow diagram illustrating a process that may be carried out by the system of FIG. 2 (or other system described herein) according to one or more further embodiments of the present invention.

With reference to the drawings, wherein like numerals indicate like elements, there is shown in FIG. 2 a system 100 that may be adapted for carrying out one or more features of the present invention. For the purposes of brevity and clarity, the block diagram of FIG. 2 will be referred to and described herein as illustrating an apparatus 100, it being understood, however, that the description may readily be applied to various aspects of a method with equal force. Reference is also made to FIG. 3, which is a flow diagram illustrating a process that may be carried out by the system 100 (or other system described herein) according to one or more further embodiments of the present invention.

The apparatus 100 preferably includes a plurality of circuit blocks 102A-H, a plurality of gate circuits 150A-H, and a control circuit 152. In an alternative embodiment of the invention, the system 100 may also include a master gate circuit 140.

It is understood that any number of circuit blocks 102 may be employed without departing from the spirit and scope of the one or more embodiments of the invention. The circuit blocks 102 are generally operable to produce one or more output signals in response to operating power and one or more input signals. For example, the circuit blocks 102 may be digital circuits, such as combinational logic circuits, processing circuits, microprocessor circuits, digital signal processing circuits, etc.

In a preferred embodiment, circuit blocks 102 are processors 102 that may be implemented utilizing any of the known technologies that are capable of requesting data from a system memory (not shown), and manipulating the data to achieve a desirable result. For example, the processors 102 may be implemented using any of the known microprocessors that are capable of executing software and/or firmware, including standard microprocessors, distributed microprocessors, etc. By way of example, the processors 102 may be graphics processors that are capable of requesting and manipulating data, such as pixel data, including gray scale information, color information, texture data, polygonal information, video frame information, etc.

The gate circuits 150 are each preferably operable to selectively supply operating power VDC1 the circuit blocks 102 in response to one or more respective control signals 154 output from the control circuit 152. It is understood that each gate circuit 150 may selectively supply the operating power VDC1 to a single circuit block 102 (as shown) or to multiple blocks 102. When utilized, the master gate circuit 140 is preferably operable to supply the operating power VDC1 to the gate circuits 150 in response to a delay functionality (discussed in more detail below).

With reference to FIG. 3, the circuit blocks 102 are preferably tested during manufacture to determine whether they are faulty (action 200) In an alternative embodiment, some circuit blocks 102 may be designated faulty even if they function properly in order to reduce the number of operational circuits 102 in the system 100. In either case, the designation of a faulty circuit is preferably noted and used to program the control circuit 152 (action 202). In a general sense, the control circuit 152 is programmed such that it is operable to produce the control signaling 154 to indicate, when valid, not to supply the first operating power to any of the circuit blocks 102 that are predetermined to be disabled.

Figure 4:
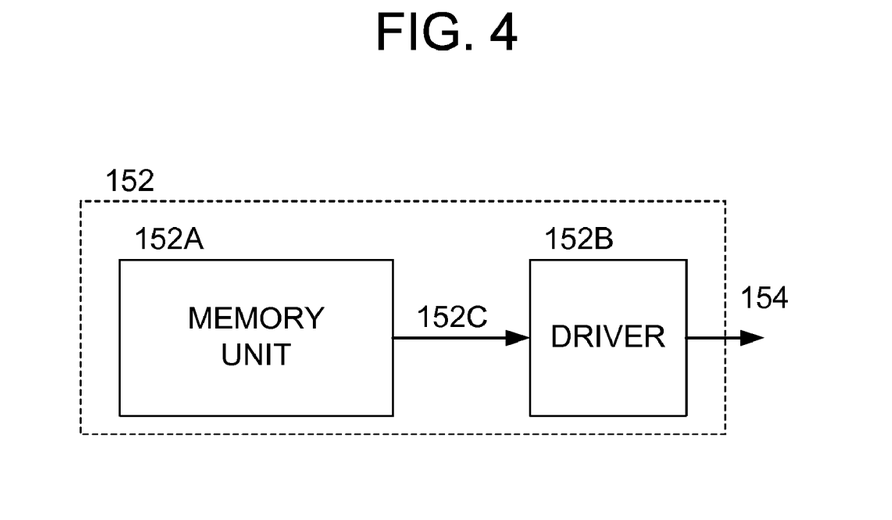
FIG. 4 is a block diagram illustrating a configuration suitable for implementing a control circuit according to one or more embodiments of the present invention.

FIG. 4 is a block diagram illustrating a configuration suitable for implementing the control circuit 152 in accordance with one or more embodiments of the present invention. The control circuit 152 includes a memory circuit 152A and a driver circuit 152B coupled to one another by way of one or more signal lines 152C. In one or more embodiments, the memory circuit 152A may be a plurality of e-fuses, or the like, that are permanently configured during the manufacturing process to provide appropriate signaling that conveys the fault status of the plurality of circuit blocks 102. In one or more further embodiments, the memory circuit 152A may be a read only memory (ROM). The ROM may thus contain information that indicates failure status for the circuit blocks 102. The driver circuit 152B may be implemented using appropriate circuitry to interface between the memory circuit 152A and the gate circuits 150. As noted above, the circuit blocks 102 are preferably tested during manufacture to determine whether they are faulty (or otherwise designated as being faulty) such information is programmed into the control circuit 152 (action 202).

Thereafter, the system is powered up (action 204) The control circuit 152 requires operating power to produce the control signals 154, although it may take some period of time before the control signals are "valid," e.g., at a state that properly indicates whether the associated gate circuit(s) 150 should or should not permit operating power VDC1 to pass to the circuit blocks 102. Thus, operating power is preferably provided to the control circuit 152 before the operating power VDC1 is available to the gate circuits 150 (action 206). At some appropriate time, the operating power VDC1 is then made available to the gate circuits 150 (action 208). The delay between application of the operating power to the control circuit 152 and the availability of the operating power VDC1 to the gate circuits 150 is preferably long enough to ensure that the control signals 154 are valid.

In accordance with one or more embodiments of the present invention the delay between application of the operating power to the control circuit 152 and the availability of the operating power VDC1 to the gate circuits 150 may be achieved using the master gate circuit 140. The master gate circuit 140 is preferably operable to produce the operating power VDC1 on node 112 in response to the operating power VDC input thereto by gating the power VDC in accordance with a delay. Those skilled in the art will appreciate the numerous ways in which such gating may be implemented, such as by way of controlled transistor switching, RC timing circuits, etc. Preferably, the delay in gating the power VDC to node 112 is predetermined and/or fixed.

In accordance with one or more further embodiments of the present invention the delay between application of the operating power to the control circuit 152 and the availability of the operating power VDC1 to the gate circuits 150 may be achieved using a first power supply (without master gate circuit 140) operable to produce the operating power VDC1 for the gate circuits 150, and a second power supply operable to produce the operating power VDC2 for the control circuit 152. The second power supply may be operable to provide the operating power VDC2 to the control circuit 152 before the first power supply makes the power VDC1 available to the gate circuits 150.

Once the control signals 154 are stable and valid, the gate circuits 150 may then selectively supply operating power VDC1 the circuit blocks 102 in response to one or more respective control signals 154 output from the control circuit 152 (action 210).

It is advantageous for the control signals 154 to stabilize before the gate circuits 150 receive operating power VDC1 on node 112 because, otherwise, a defective circuit block 102 might receive power for some period of time before the control signals 154 stabilize. Such a situation is undesirable since power is thus wasted and interference with other processors may occur. For example, if the circuit blocks 102 are processors, then the processors will attempt various initialization routines at power up. Excessive electromagnetic interference or other types of noise caused by defective processors improperly receiving power might disrupt the initialization. At best the affected processor might be initialized through a repeated power up sequence; at worst, the processor might never initialize.

Figure 5:
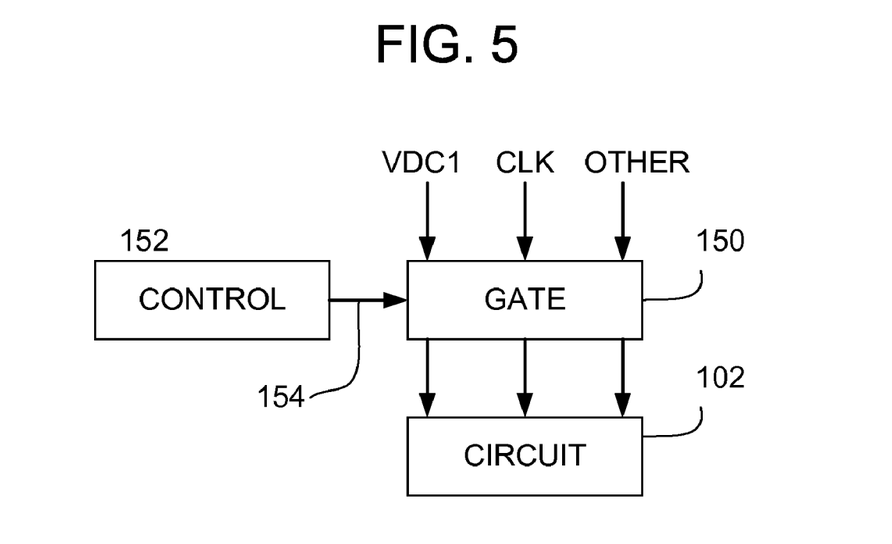
FIG. 5 is a block diagram illustrating further and alternative aspects of the present invention.
Figure 6:
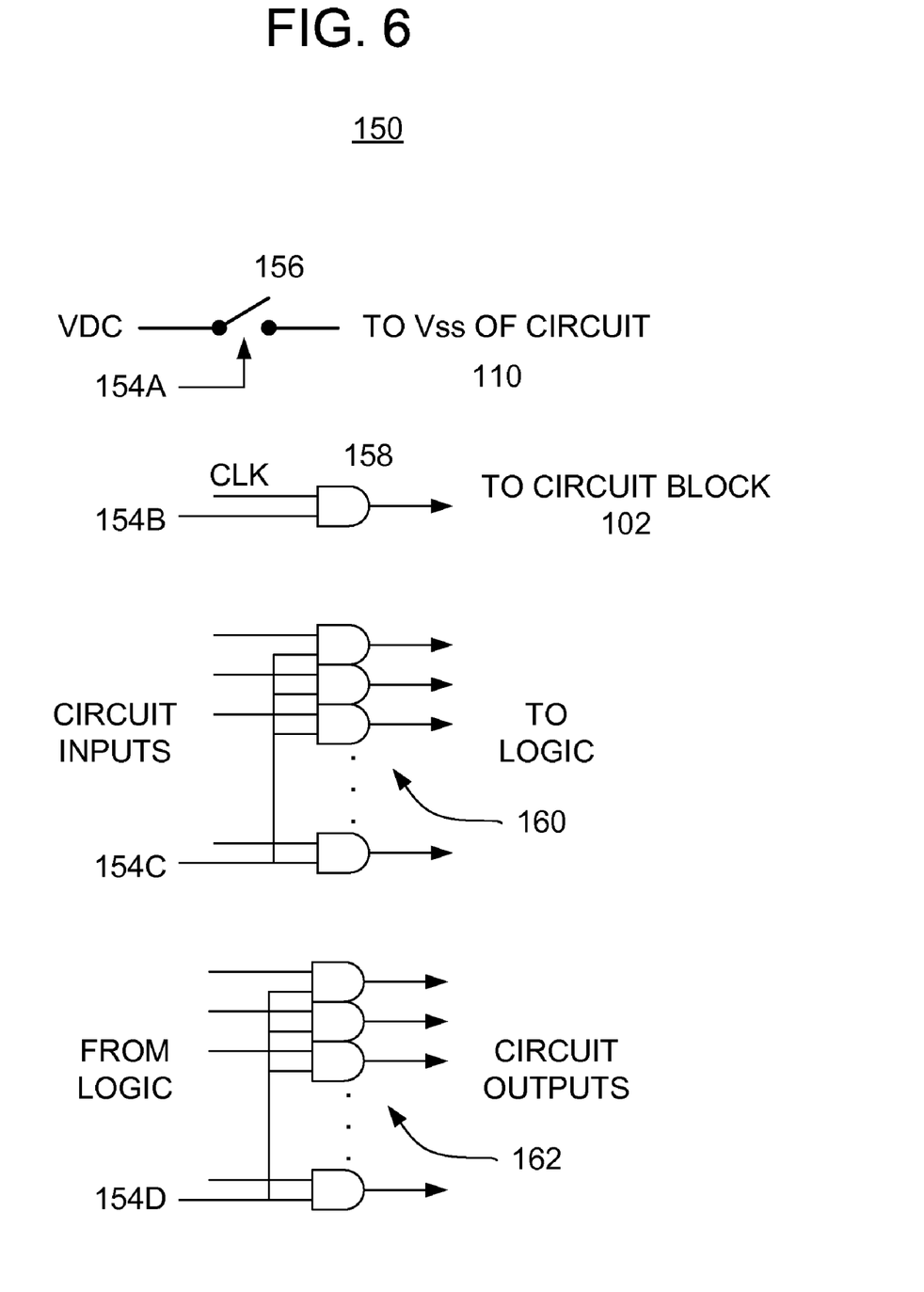
FIG. 6 is a block diagram illustrating a configuration suitable for implementing a gating circuit according to one or more embodiments of the present invention.

With reference to FIG. 5, the gate circuit 150 is preferably operable to produce the operating power VDC1 on the respective power terminals 110 of the circuit blocks 102 by gating the power VDC1 on terminal 112 in accordance with the control signals 154. With reference to FIG. 6, those skilled in the art will appreciate the numerous ways in which such gating may be implemented, such as by way of controlled transistor switching 156.

With reference to FIG. 5, the gate circuit 150 is also preferably operable to use the control signaling 154 to gate clock signal(s) to the disabled circuit blocks 102. For example, the gate circuit 150 (FIG. 6) may include a logic gate 158 (such as an AND gate or the like) to enable/disable the clock signal CLK to the circuit block 102. The gate circuits 150n are also preferably operable to use the control signaling 154 to gate one or more outputs from the disabled circuit blocks 102. For example, the gate circuit 150 (FIG. 6) may include a plurality of logic gates 162 (such as AND gates or the like) to enable/disable the output signals from the disabled circuit block 102. Still further, the gate circuits 150 are preferably operable to use the control signaling 154 to gate one or more inputs to the disabled circuit blocks 102. For example, the gate circuit 150 (FIG. 6) may include a plurality of logic gates 160 (such as AND gates or the like) to enable/disable the input signals to the disabled circuit block 102.

The circuit blocks 102 are preferably implemented as an integrated circuit (illustrated by way of dashed line in FIG. 2) and are each powered by way of a respective power grid (not shown) that receives the operating power VDC1 from the associated gate circuit 150. Each circuit block 102 preferably powered by way of voltage potential between Vss and Vdd terminals (not shown) Usually, Vdd will be at ground potential (0V), although one or more embodiments of the present invention may provide for a negative potential for Vdd. In this regard, it is understood that the term "ground" is a name that may be associated with a node in the system to which reference will be made. Thus, "ground" may be 0V or may represent some other reference potential.

It is noted that the circuit blocks 102 may be integrated separately from the gate circuits 150, 140 and the control circuit 152. In this situation, the integrated circuit would preferably include a plurality of separate power pins (or terminals) 110 that may be connected to the respective gate circuits 150. Alternatively, the circuit blocks 102 may be integrated with the gate circuits 150, in which case only one power pin (terminal) 112 need be provided to the circuit.

Figure 7:
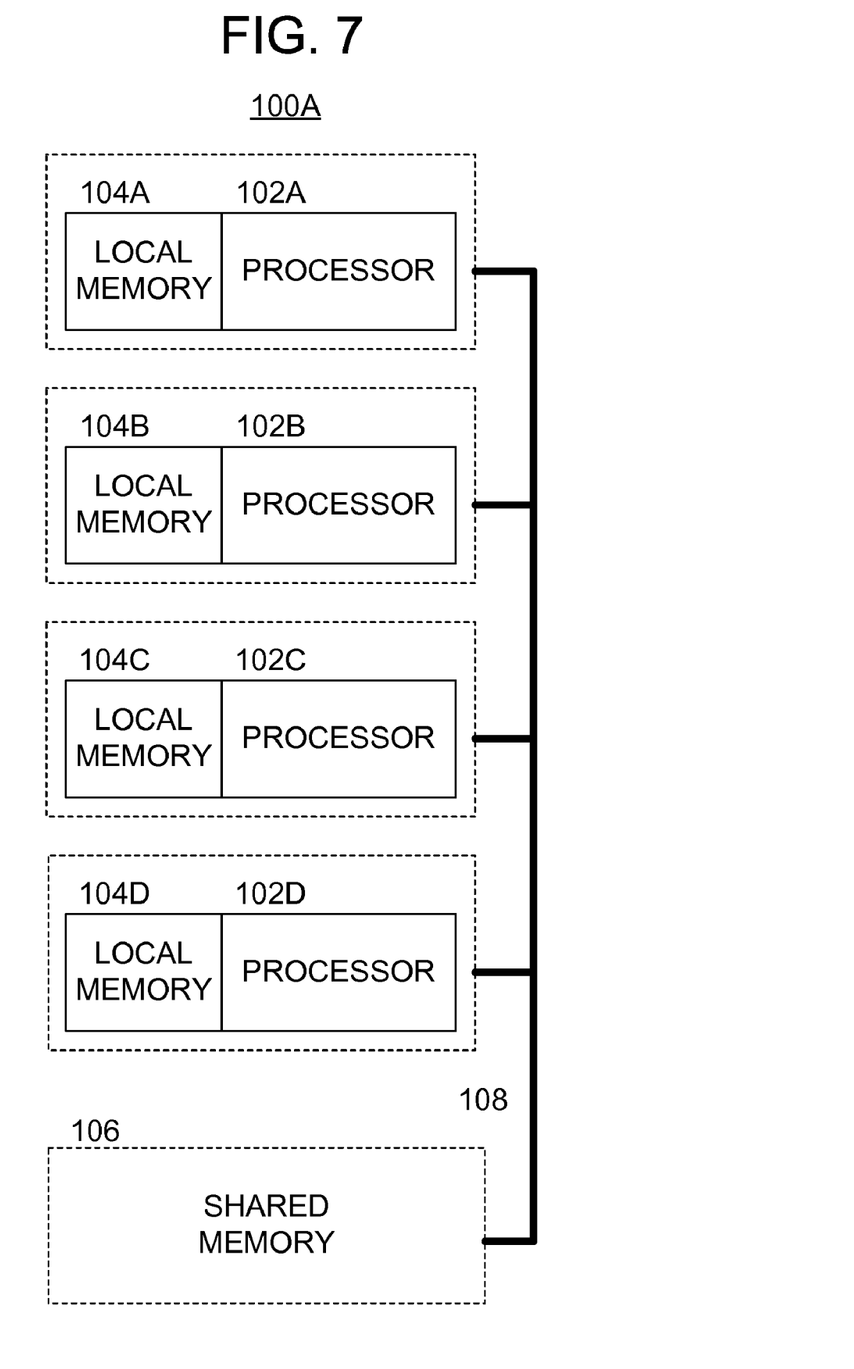
FIG. 7 is a diagram illustrating a multiprocessing system that may be adapted to utilize the gating apparatus and functionality discussed above in order to achieve one or more further embodiments of the present invention.

FIG. 7 is a block diagram of a multi-processing system 100A that may be adapted to implement the features discussed herein and one or more further embodiments of the present invention. The system 100A includes a plurality of processors 102A-D, associated local memories 104A-D, and a shared memory 106 interconnected by way of a bus 108. The shared memory 106 may also be referred to herein as a main memory or system memory. The methods and/or circuit functionality discussed above may also be applied to the circuit configuration of FIG. 7, where the processors 102 are the circuit blocks discussed above.

Although four processors 102 are illustrated by way of example, any number may be utilized without departing from the spirit and scope of the present invention. Each of the processors 102 may be of similar construction or of differing construction. The local memories 104 are preferably located on the same chip (same semiconductor substrate) as their respective processors 102; however, the local memories 104 are preferably not traditional hardware cache memories in that there are no on-chip or off-chip hardware cache circuits, cache registers, cache memory controllers, etc. to implement a hardware cache memory function.

The processors 102 preferably provide data access requests to copy data (which may include program data) from the system memory 106 over the bus 108 into their respective local memories 104 for program execution and data manipulation. The mechanism for facilitating data access is preferably implemented utilizing a direct memory access controller (DMAC), not shown. The DMAC of each processor is preferably of substantially the same capabilities as discussed hereinabove with respect to other features of the invention.

The system memory 106 is preferably a dynamic random access memory (DRAM) coupled to the processors 102 through a high bandwidth memory connection (not shown). Although the system memory 106 is preferably a DRAM, the memory 106 may be implemented using other means, e.g., a static random access memory (SRAM), a magnetic random access memory (MRAM), an optical memory, a holographic memory, etc.

Each processor 102 is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the processors 102 may include an instruction buffer, instruction decode circuitry, dependency check circuitry, instruction issue circuitry, and execution stages.

In one or more embodiments, the processors 102 and the local memories 104 may be disposed on a common semiconductor substrate. In one or more further embodiments, the shared memory 106 may also be disposed on the common semiconductor substrate or it may be separately disposed.

In one or more alternative embodiments, one or more of the processors 102 may operate as a main processor operatively coupled to the other processors 102 and capable of being coupled to the shared memory 106 over the bus 108. The main processor may schedule and orchestrate the processing of data by the other processors 102. Unlike the other processors 102, however, the main processor may be coupled to a hardware cache memory, which is operable cache data obtained from at least one of the shared memory 106 and one or more of the local memories 104 of the processors 102. The main processor may provide data access requests to copy data (which may include program data) from the system memory 106 over the bus 108 into the cache memory for program execution and data manipulation utilizing any of the known techniques, such as DMA techniques.

A description of a preferred computer architecture for a multi-processor system will now be provided that is suitable for carrying out one or more of the features discussed herein. In accordance with one or more embodiments, the multi-processor system may be implemented as a single-chip solution operable for stand-alone and/or distributed processing of media-rich applications, such as game systems, home terminals, PC systems, server systems and workstations. In some applications, such as game systems and home terminals, real-time computing may be a necessity. For example, in a real-time, distributed gaming application, one or more of networking image decompression, 3D computer graphics, audio generation, network communications, physical simulation, and artificial intelligence processes have to be executed quickly enough to provide the user with the illusion of a real-time experience. Thus, each processor in the multi-processor system must complete tasks in a short and predictable time.

To this end, and in accordance with this computer architecture, all processors of a multi-processing computer system are constructed from a common computing module (or cell). This common computing module has a consistent structure and preferably employs the same instruction set architecture. The multi-processing computer system can be formed of one or more clients, servers, PCs, mobile computers, game machines, PDAs, set top boxes, appliances, digital televisions and other devices using computer processors.

A plurality of the computer systems may also be members of a network if desired. The consistent modular structure enables efficient, high speed processing of applications and data by the multi-processing computer system, and if a network is employed, the rapid transmission of applications and data over the network. This structure also simplifies the building of members of the network of various sizes and processing power and the preparation of applications for processing by these members.

Figure 8:
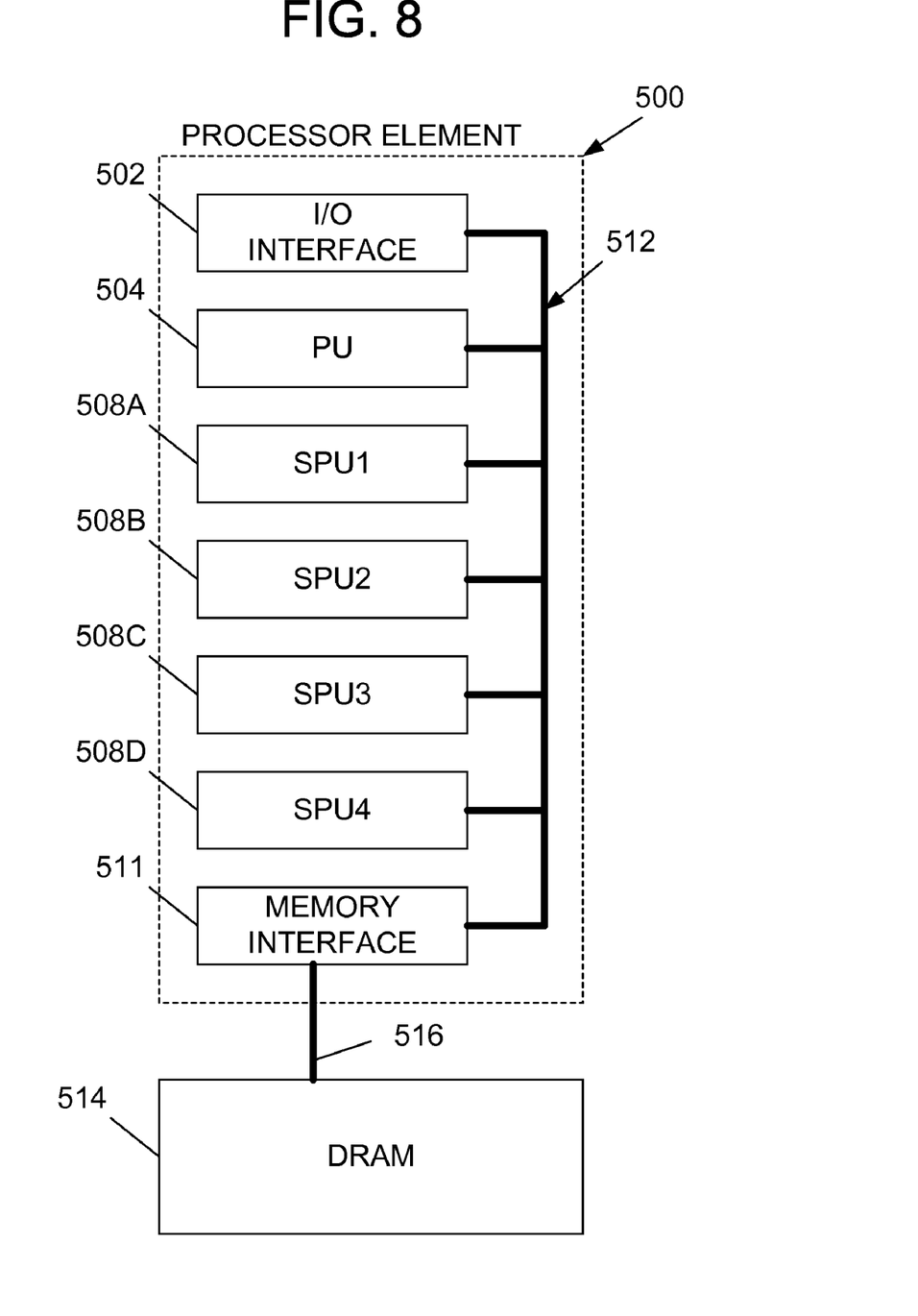
FIG. 8 is a diagram illustrating a processor element (PE) that may be used to implement one or more further aspects of the present invention.

With reference to FIG. 8, the basic processing module is a processor element (PE) 500. The PE 500 comprises an I/O interface 502, a processing unit (PU) 504, and a plurality of sub-processing units 508, namely, sub-processing unit 508A, sub-processing unit 508B, sub-processing unit 508C, and sub-processing unit 508D. A local (or internal) PE bus 512 transmits data and applications among the PU 504, the sub-processing units 508, and a memory interface 511. The local PE bus 512 can have, e.g., a conventional architecture or can be implemented as a packet-switched network. If implemented as a packet switch network, while requiring more hardware, increases the available bandwidth.

The PE 500 can be constructed using various methods for implementing digital logic. The PE 500 preferably is constructed, however, as a single integrated circuit employing a complementary metal oxide semiconductor (CMOS) on a silicon substrate. Alternative materials for substrates include gallium arsinide, gallium aluminum arsinide and other so-called III-B compounds employing a wide variety of dopants. The PE 500 also may be implemented using superconducting material, e.g., rapid single-flux-quantum (RSFQ) logic.

The PE 500 is closely associated with a shared (main) memory 514 through a high bandwidth memory connection 516. Although the memory 514 preferably is a dynamic random access memory (DRAM), the memory 514 could be implemented using other means, e.g., as a static random access memory (SRAM), a magnetic random access memory (MRAM), an optical memory, a holographic memory, etc.

The PU 504 and the sub-processing units 508 are preferably each coupled to a memory flow controller (MFC) including direct memory access DMA functionality, which in combination with the memory interface 511, facilitate the transfer of data between the DRAM 514 and the sub-processing units 508 and the PU 504 of the PE 500. It is noted that the DMAC and/or the memory interface 511 may be integrally or separately disposed with respect to the sub-processing units 508 and the PU 504. Indeed, the DMAC function and/or the memory interface 511 function may be integral with one or more (preferably all) of the sub-processing units 508 and the PU 504. It is also noted that the DRAM 514 may be integrally or separately disposed with respect to the PE 500. For example, the DRAM 514 may be disposed off-chip as is implied by the illustration shown or the DRAM 514 may be disposed on-chip in an integrated fashion.

The PU 504 can be, e.g., a standard processor capable of stand-alone processing of data and applications. In operation, the PU 504 preferably schedules and orchestrates the processing of data and applications by the sub-processing units. The sub-processing units preferably are single instruction, multiple data (SIMD) processors. Under the control of the PU 504, the sub-processing units perform the processing of these data and applications in a parallel and independent manner. The PU 504 is preferably implemented using a PowerPC core, which is a microprocessor architecture that employs reduced instruction-set computing (RISC) technique. RISC performs more complex instructions using combinations of simple instructions. Thus, the timing for the processor may be based on simpler and faster operations, enabling the microprocessor to perform more instructions for a given clock speed.

It is noted that the PU 504 may be implemented by one of the sub-processing units 508 taking on the role of a main processing unit that schedules and orchestrates the processing of data and applications by the sub-processing units 508. Further, there may be more than one PU implemented within the processor element 500.

In accordance with this modular structure, the number of PEs 500 employed by a particular computer system is based upon the processing power required by that system. For example, a server may employ four PEs 500, a workstation may employ two PEs 500 and a PDA may employ one PE 500. The number of sub-processing units of a PE 500 assigned to processing a particular software cell depends upon the complexity and magnitude of the programs and data within the cell.

Figure 9:
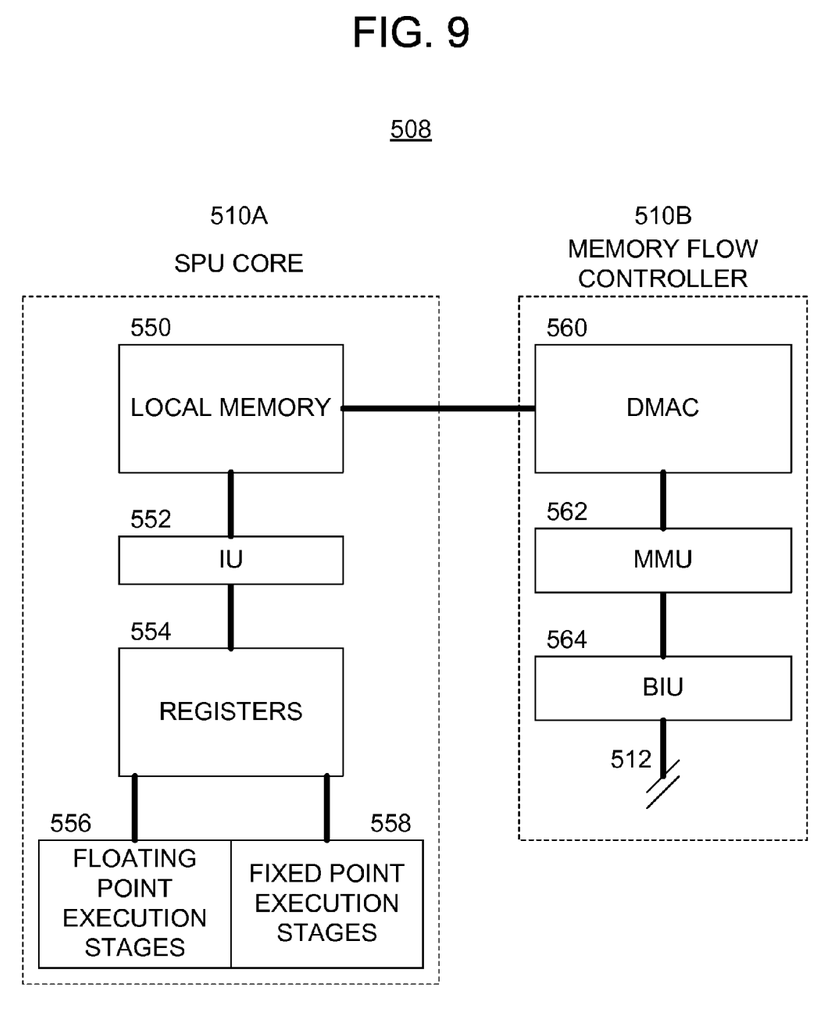
FIG. 9 is a diagram illustrating the structure of an exemplary sub-processing unit (SPU) of the system of FIG. 8 that may be adapted in accordance with one or more further aspects of the present invention.

FIG. 9 illustrates the preferred structure and function of a sub-processing unit (SPU) 508. The SPU 508 architecture preferably fills a void between general-purpose processors (which are designed to achieve high average performance on a broad set of applications) and special-purpose processors (which are designed to achieve high performance on a single application). The SPU 508 is designed to achieve high performance on game applications, media applications, broadband systems, etc., and to provide a high degree of control to programmers of real-time applications. Some capabilities of the SPU 508 include graphics geometry pipelines, surface subdivision, Fast Fourier Transforms, image processing keywords, stream processing, MPEG encoding/decoding, encryption, decryption, device driver extensions, modeling, game physics, content creation, and audio synthesis and processing.

The sub-processing unit 508 includes two basic functional units, namely an SPU core 510A and a memory flow controller (MFC) 510B. The SPU core 510A performs program execution, data manipulation, etc., while the MFC 510B performs functions related to data transfers between the SPU core 510A and the DRAM 514 of the system.

The SPU core 510A includes a local memory 550, an instruction unit (IU) 552, registers 554, one ore more floating point execution stages 556 and one or more fixed point execution stages 558. The local memory 550 is preferably implemented using single-ported random access memory, such as an SRAM. Whereas most processors reduce latency to memory by employing caches, the SPU core 510A implements the relatively small local memory 550 rather than a cache. Indeed, in order to provide consistent and predictable memory access latency for programmers of real-time applications (and other applications as mentioned herein) a cache memory architecture within the SPU 508A is not preferred. The cache hit/miss characteristics of a cache memory results in volatile memory access times, varying from a few cycles to a few hundred cycles. Such volatility undercuts the access timing predictability that is desirable in, for example, real-time application programming. Latency hiding may be achieved in the local memory SRAM 550 by overlapping DMA transfers with data computation. This provides a high degree of control for the programming of real-time applications. As the latency and instruction overhead associated with DMA transfers exceeds that of the latency of servicing a cache miss, the SRAM local memory approach achieves an advantage when the DMA transfer size is sufficiently large and is sufficiently predictable (e.g., a DMA command can be issued before data is needed).

A program running on a given one of the sub-processing units 508 references the associated local memory 550 using a local address, however, each location of the local memory 550 is also assigned a real address (RA) within the overall system's memory map. This allows Privilege Software to map a local memory 550 into the Effective Address (EA) of a process to facilitate DMA transfers between one local memory 550 and another local memory 550. The PU 504 can also directly access the local memory 550 using an effective address. In a preferred embodiment, the local memory 550 contains 556 kilobytes of storage, and the capacity of registers 552 is 128×128 bits.

The SPU core 504A is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the IU 552 includes an instruction buffer, instruction decode circuitry, dependency check circuitry, and instruction issue circuitry.

The instruction buffer preferably includes a plurality of registers that are coupled to the local memory 550 and operable to temporarily store instructions as they are fetched. The instruction buffer preferably operates such that all the instructions leave the registers as a group, i.e., substantially simultaneously. Although the instruction buffer may be of any size, it is preferred that it is of a size not larger than about two or three registers.

In general, the decode circuitry breaks down the instructions and generates logical micro-operations that perform the function of the corresponding instruction. For example, the logical micro-operations may specify arithmetic and logical operations, load and store operations to the local memory 550, register source operands and/or immediate data operands. The decode circuitry may also indicate which resources the instruction uses, such as target register addresses, structural resources, function units and/or busses. The decode circuitry may also supply information indicating the instruction pipeline stages in which the resources are required. The instruction decode circuitry is preferably operable to substantially simultaneously decode a number of instructions equal to the number of registers of the instruction buffer.

The dependency check circuitry includes digital logic that performs testing to determine whether the operands of given instruction are dependent on the operands of other instructions in the pipeline. If so, then the given instruction should not be executed until such other operands are updated (e.g., by permitting the other instructions to complete execution). It is preferred that the dependency check circuitry determines dependencies of multiple instructions dispatched from the decoder circuitry 112 simultaneously.

The instruction issue circuitry is operable to issue the instructions to the floating point execution stages 556 and/or the fixed point execution stages 558.

The registers 554 are preferably implemented as a relatively large unified register file, such as a 128-entry register file. This allows for deeply pipelined high-frequency implementations without requiring register renaming to avoid register starvation. Renaming hardware typically consumes a significant fraction of the area and power in a processing system. Consequently, advantageous operation may be achieved when latencies are covered by software loop unrolling or other interleaving techniques.

Preferably, the SPU core 510A is of a superscalar architecture, such that more than one instruction is issued per clock cycle. The SPU core 510A preferably operates as a superscalar to a degree corresponding to the number of simultaneous instruction dispatches from the instruction buffer, such as between 2 and 3 (meaning that two or three instructions are issued each clock cycle). Depending upon the required processing power, a greater or lesser number of floating point execution stages 556 and fixed point execution stages 558 may be employed. In a preferred embodiment, the floating point execution stages 556 operate at a speed of 32 billion floating point operations per second (32 GFLOPS), and the fixed point execution stages 558 operate at a speed of 32 billion operations per second (32 GOPS).

The MFC 510B preferably includes a bus interface unit (BIU) 564, a memory management unit (MMU) 562, and a direct memory access controller (DMAC) 560. With the exception of the DMAC 560, the MFC 510B preferably runs at half frequency (half speed) as compared with the SPU core 510A and the bus 512 to meet low power dissipation design objectives. The MFC 510B is operable to handle data and instructions coming into the SPU 508 from the bus 512, provides address translation for the DMAC, and snoop-operations for data coherency. The BIU 564 provides an interface between the bus 512 and the MMU 562 and DMAC 560. Thus, the SPU 508 (including the SPU core 510A and the MFC 510B) and the DMAC 560 are connected physically and/or logically to the bus 512.

The MMU 562 is preferably operable to translate effective addresses (taken from DMA commands) into real addresses for memory access. For example, the MMU 562 may translate the higher order bits of the effective address into real address bits. The lower-order address bits, however, are preferably untranslatable and are considered both logical and physical for use to form the real address and request access to memory. In one or more embodiments, the MMU 562 may be implemented based on a 64-bit memory management model, and may provide $2^{64}$ bytes of effective address space with 4K-, 64K-, 1M-, and 16M-byte page sizes and 256 MB segment sizes. Preferably, the MMU 562 is operable to support up to $2^{65}$ bytes of virtual memory, and $2^{42}$ bytes (4 TeraBytes) of physical memory for DMA commands. The hardware of the MMU 562 may include an 8-entry, fully associative SLB, a 256-entry, 4 way set associative TLB, and a 4×4 Replacement Management Table (RMT) for the TLB-used for hardware TLB miss handling.

The DMAC 560 is preferably operable to manage DMA commands from the SPU core 510A and one or more other devices such as the PU 504 and/or the other SPUs. There may be three categories of DMA commands: Put commands, which operate to move data from the local memory 550 to the shared memory 514; Get commands, which operate to move data into the local memory 550 from the shared memory 514; and Storage Control commands, which include SLI commands and synchronization commands. The synchronization commands may include atomic commands, send signal commands, and dedicated barrier commands. In response to DMA commands, the MMU 562 translates the effective address into a real address and the real address is forwarded to the BIU 564.

The SPU core 510A preferably uses a channel interface and data interface to communicate (send DMA commands, status, etc.) with an interface within the DMAC 560. The SPU core 510A dispatches DMA commands through the channel interface to a DMA queue in the DMAC 560. Once a DMA command is in the DMA queue, it is handled by issue and completion logic within the DMAC 560. When all bus transactions for a DMA command are finished, a completion signal is sent back to the SPU core 510A over the channel interface.

Figure 10:
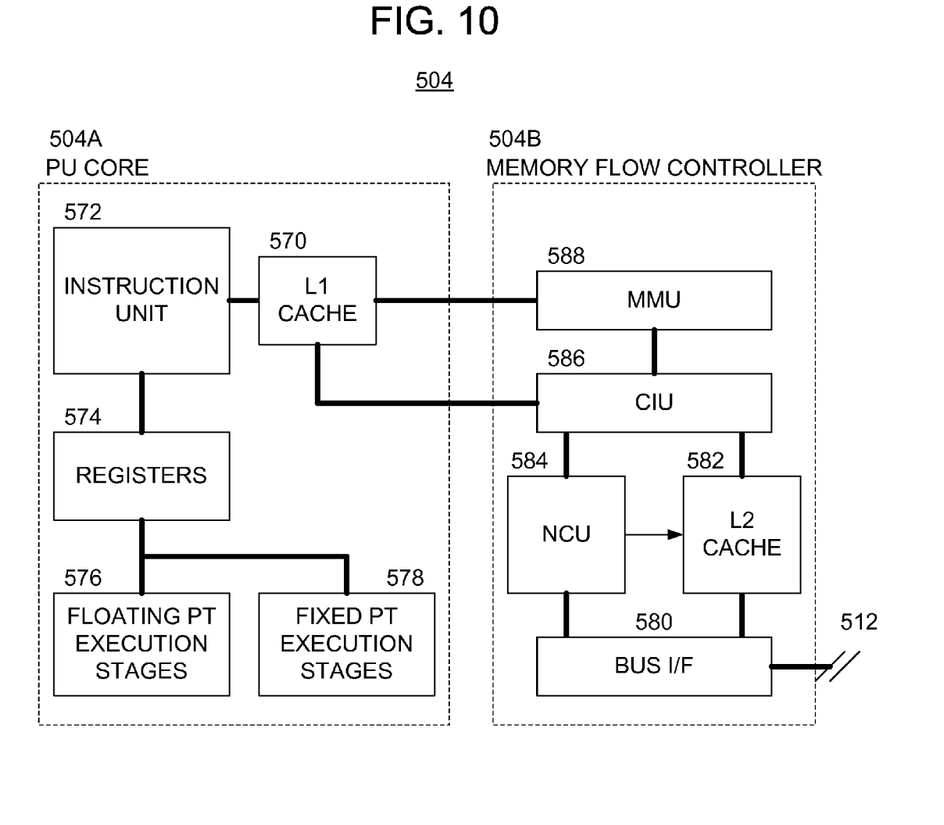
FIG. 10 is a diagram illustrating the structure of an exemplary processing unit (PU) of the system of FIG. 8 that may be adapted in accordance with one or more further aspects of the present invention.

FIG. 10 illustrates the preferred structure and function of the PU 504. The PU 504 includes two basic functional units, the PU core 504A and the memory flow controller (MFC) 504B. The PU core 504A performs program execution, data manipulation, multi-processor management functions, etc., while the MFC 504B performs functions related to data transfers between the PU core 504A and the memory space of the system 100.

The PU core 504A may include an L1 cache 570, an instruction unit 572, registers 574, one or more floating point execution stages 576 and one or more fixed point execution stages 578. The L1 cache provides data caching functionality for data received from the shared memory 106, the processors 102, or other portions of the memory space through the MFC 504B. As the PU core 504A is preferably implemented as a superpipeline, the instruction unit 572 is preferably implemented as an instruction pipeline with many stages, including fetching, decoding, dependency checking, issuing, etc. The PU core 504A is also preferably of a superscalar configuration, whereby more than one instruction is issued from the instruction unit 572 per clock cycle. To achieve a high processing power, the floating point execution stages 576 and the fixed point execution stages 578 include a plurality of stages in a pipeline configuration. Depending upon the required processing power, a greater or lesser number of floating point execution stages 576 and fixed point execution stages 578 may be employed.

The MFC 504B includes a bus interface unit (BIU) 580, an L2 cache memory, a non-cachable unit (NCU) 584, a core interface unit (CIU) 586, and a memory management unit (MMU) 588. Most of the MFC 504B runs at half frequency (half speed) as compared with the PU core 504A and the bus 108 to meet low power dissipation design objectives.

The BIU 580 provides an interface between the bus 108 and the L2 cache 582 and NCU 584 logic blocks. To this end, the BIU 580 may act as a Master as well as a Slave device on the bus 108 in order to perform fully coherent memory operations. As a Master device it may source load/store requests to the bus 108 for service on behalf of the L2 cache 582 and the NCU 584. The BIU 580 may also implement a flow control mechanism for commands which limits the total number of commands that can be sent to the bus 108. The data operations on the bus 108 may be designed to take eight beats and, therefore, the BIU 580 is preferably designed around 128 byte cache-lines and the coherency and synchronization granularity is 128KB.

The L2 cache memory 582 (and supporting hardware logic) is preferably designed to cache 512 KB of data. For example, the L2 cache 582 may handle cacheable loads/stores, data pre-fetches, instruction fetches, instruction pre-fetches, cache operations, and barrier operations. The L2 cache 582 is preferably an 8-way set associative system. The L2 cache 582 may include six reload queues matching six (6) castout queues (e.g., six RC machines), and eight (64-byte wide) store queues. The L2 cache 582 may operate to provide a backup copy of some or all of the data in the L1 cache 570. Advantageously, this is useful in restoring state(s) when processing nodes are hot-swapped. This configuration also permits the L1 cache 570 to operate more quickly with fewer ports, and permits faster cache-to-cache transfers (because the requests may stop at the L2 cache 582). This configuration also provides a mechanism for passing cache coherency management to the L2 cache memory 582.

The NCU 584 interfaces with the CIU 586, the L2 cache memory 582, and the BIU 580 and generally functions as a queueing/buffering circuit for non-cacheable operations between the PU core 504A and the memory system. The NCU 584 preferably handles all communications with the PU core 504A that are not handled by the L2 cache 582, such as cache-inhibited load/stores, barrier operations, and cache coherency operations. The NCU 584 is preferably run at half speed to meet the aforementioned power dissipation objectives.

The CIU 586 is disposed on the boundary of the MFC 504B and the PU core 504A and acts as a routing, arbitration, and flow control point for requests coming from the execution stages 576, 578, the instruction unit 572, and the MMU unit 588 and going to the L2 cache 582 and the NCU 584. The PU core 504A and the MMU 588 preferably run at full speed, while the L2 cache 582 and the NCU 584 are operable for a 2:1 speed ratio. Thus, a frequency boundary exists in the CIU 586 and one of its functions is to properly handle the frequency crossing as it forwards requests and reloads data between the two frequency domains.

The CIU 586 is comprised of three functional blocks: a load unit, a store unit, and reload unit. In addition, a data pre-fetch function is performed by the CIU 586 and is preferably a functional part of the load unit. The CIU 586 is preferably operable to: (i) accept load and store requests from the PU core 504A and the MMU 588; (ii) convert the requests from full speed clock frequency to half speed (a 2:1 clock frequency conversion); (iii) route cachable requests to the L2 cache 582, and route non-cachable requests to the NCU 584; (iv) arbitrate fairly between the requests to the L2 cache 582 and the NCU 584; (v) provide flow control over the dispatch to the L2 cache 582 and the NCU 584 so that the requests are received in a target window and overflow is avoided; (vi) accept load return data and route it to the execution stages 576, 578, the instruction unit 572, or the MMU 588; (vii) pass snoop requests to the execution stages 576, 578, the instruction unit 572, or the MMU 588; and (viii) convert load return data and snoop traffic from half speed to full speed.

The MMU 588 preferably provides address translation for the PU core 540A, such as by way of a second level address translation facility. A first level of translation is preferably provided in the PU core 504A by separate instruction and data ERAT (effective to real address translation) arrays that may be much smaller and faster than the MMU 588.

In a preferred embodiment, the PU 504 operates at 4 -6 GHz, 10F04, with a 64-bit implementation. The registers are preferably 64 bits long (although one or more special purpose registers may be smaller) and effective addresses are 64 bits long. The instruction unit 570, registers 572 and execution stages 574 and 576 are preferably implemented using PowerPC technology to achieve the (RISC) computing technique.

Additional details regarding the modular structure of this computer system may be found in U.S. Pat. No. 6,526,491, the entire disclosure of which is hereby incorporated by reference.

In accordance with at least one further aspect of the present invention, the methods and apparatus described above may be achieved utilizing suitable hardware, such as that illustrated in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the apparatus illustrated in the figures are shown as being partitioned into certain functional blocks, such blocks may be implemented by way of separate circuitry and/or combined into one or more functional units. Still further, the various aspects of the invention may be implemented by way of software and/or firmware program(s) that may be stored on suitable storage medium or media (such as floppy disk(s), memory chip(s), etc.) for transportability and/or distribution.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, comprising:
   selectively supplying a first source of power to a plurality of circuit blocks of a system using a plurality of gate circuits responsive to respective control signals provided by at least one control circuit;
   providing a second source of power to operate the control circuit before the first source of power is available to the gate circuits such that the control signals are valid before the first source of power is available to the gate circuits; and
   producing the second source of power by gating the first source of power in accordance with a delay.

2. The method of claim 1, wherein the control signals, when valid, indicate not supplying the first source of power to any of the circuit blocks that are predetermined to be disabled.

3. The method of claim 1, wherein the delay is at least one of predetermined and fixed.

4. The method of claim 1, wherein the first and second sources of power are separate power supplies.

5. The method of claim 4, further comprising: initiating the second power supply before the first power supply.

6. The method of claim 1, wherein the plurality of circuit blocks include processors of a multi-processing system.

7. A method, comprising:
selectively supplying a first source of power to a plurality of circuit blocks of a system using a plurality of gate circuits responsive to respective control signals provided by at least one control circuit;
providing a second source of power to operate the control circuit before the first source of power is available to the gate circuits such that the control signals are valid before the first source of power is available to the gate circuits
producing the control signals to indicate, when valid, that the first source of power should not be supplied to any of the circuit blocks that are predetermined to be disabled; and
using the control signals to gate clock signal(s) to the disabled circuit blocks.

8. The method of claim 7, further comprising: using the control signals to gate one or more outputs from the disabled circuit blocks.

9. The method of claim 7, further comprising: using the control signals to gate one or more inputs to the disabled circuit blocks.

10. An apparatus, comprising:
a plurality of circuit blocks operable to produce one or more output signals in response to first operating power and one or more input signals;
a plurality of gate circuits, each operable to selectively supply the first operating power to at least one of the circuit blocks in response to one or more respective control signals;
at least one control circuit operable to produce the control signals in response to at least second operating power; and
a master gating circuit operable to produce the second source of power by gating the first source of power in accordance with a delay,
wherein the second operating power is provided to the control circuit before the first operating power is available to the gate circuits such that the control signals are valid before the first source of power is available to the gate circuits.

11. The apparatus of claim 10, wherein the control circuit is operable to produce the control signals to indicate, when valid, not to supply the first operating power to any of the circuit blocks that are predetermined to be disabled.

12. The apparatus of claim 11, wherein the control circuit includes:
at least one memory circuit operable to store information indicative of which of the circuit blocks are predetermined to be disabled; and
driver circuitry operable to produce the control signals from the information.

13. The apparatus of claim 12, wherein the at least one memory circuit includes at least one of e-fuses and a read only memory to store the information.

14. The apparatus of claim 10, wherein the delay is at least one of predetermined and fixed.

15. The apparatus of claim 10, further comprising:
a first power supply operable to produce the first operating power; and
a second power supply operable to produce the second operating power.

16. The apparatus of claim 15, wherein the second power supply is operable to provide the second operating power before the first power supply.

17. The apparatus of claim 10, wherein the plurality of circuit blocks include processors of a multi-processing system.

18. An apparatus, comprising:
a plurality of circuit blocks operable to produce one or more output signals in response to first operating power and one or more input signals;
a plurality of gate circuits, each operable to selectively supply the first operating power to at least one of the circuit blocks in response to one or more respective control signals;
at least one control circuit operable to produce the control signals in response to at least second operating power; and
a master gating circuit operable to produce the second source of power by gating the first source of power in accordance with a delay, wherein:
the second operating power is provided to the control circuit before the first operating power is available to the gate circuits such that the control signals are valid before the first source of power is available to the gate circuits,
the control circuit is operable to produce the control signals to indicate, when valid, that the first operating power should not be supplied to any of the circuit blocks that are predetermined to be disabled, and
the gate circuits are operable to use the control signals to gate clock signal(s) to the disabled circuit blocks.

19. The apparatus of claim 18, wherein the gate circuits are operable to use the control signals to gate one or more outputs from the disabled circuit blocks.

20. The apparatus of claim 18, wherein the gate circuits are operable to use the control signals to gate one or more inputs to the disabled circuit blocks.

* * * * *